United States Patent [19]

Pinto et al.

[11] 4,397,628

[45] Aug. 9, 1983

[54] EXTRUSION CYLINDER ASSEMBLY

[75] Inventors: Albert A. Pinto, White Plains, N.Y.; George Ryder, West Orange, N.J.

[73] Assignee: Nabisco Brands, Inc., Parsippany, N.J.

[21] Appl. No.: 344,581

[22] Filed: Feb. 1, 1982

[51] Int. Cl.³ .................. B29F 3/01; A21C 3/04; A21C 11/16
[52] U.S. Cl. .................. 425/376 B; 99/450.1; 425/377; 425/381; 425/382 R; 425/464
[58] Field of Search .............. 425/146, 376 R, 376 A, 425/376 B, 379, 381, 382 R, 464, 378 S, 132, 6, 8, 217, 314, 377, 463, 447; 99/450.1, 450.2; 366/77

[56] References Cited

U.S. PATENT DOCUMENTS

| 2,837,042 | 6/1958 | Laval | 99/450.1 |
| 2,868,141 | 1/1959 | Griner | 99/450.2 |
| 3,400,189 | 9/1968 | Nacke | 264/167 |
| 4,279,579 | 7/1981 | Froeschke | 264/8 |

FOREIGN PATENT DOCUMENTS 2701426 7/1977 Fed. Rep. of Germany ...... 425/382

Primary Examiner—Willard E. Hoag
Attorney, Agent, or Firm—Gerald Durstewitz; Richard Kornutik

[57] ABSTRACT

Extrusion apparatus including rotary shell having plural circumferential rows of extrusion orifices and a stationary inner member, defining with said shell, circumferential channels communicating with said orifices.

14 Claims, 15 Drawing Figures

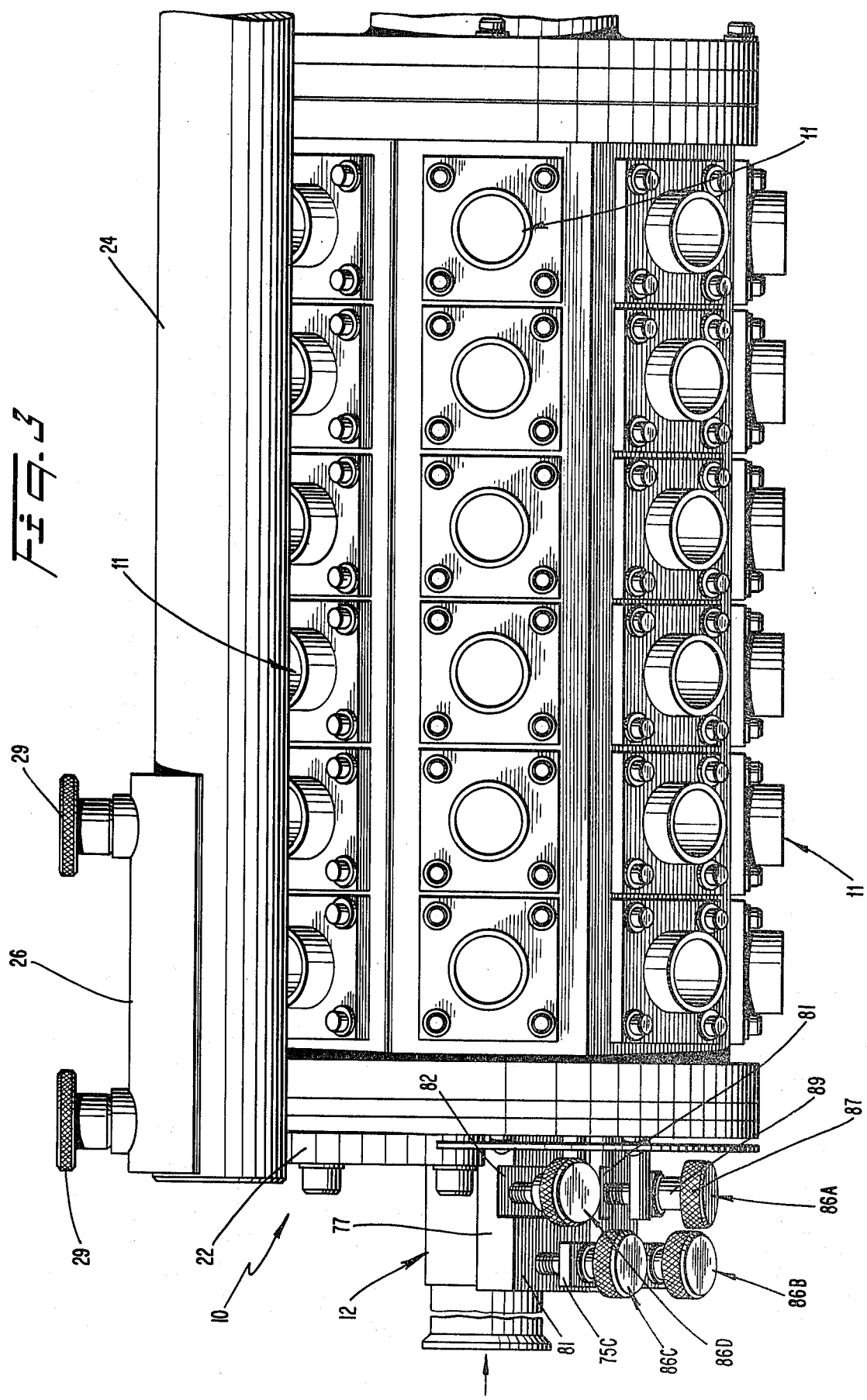

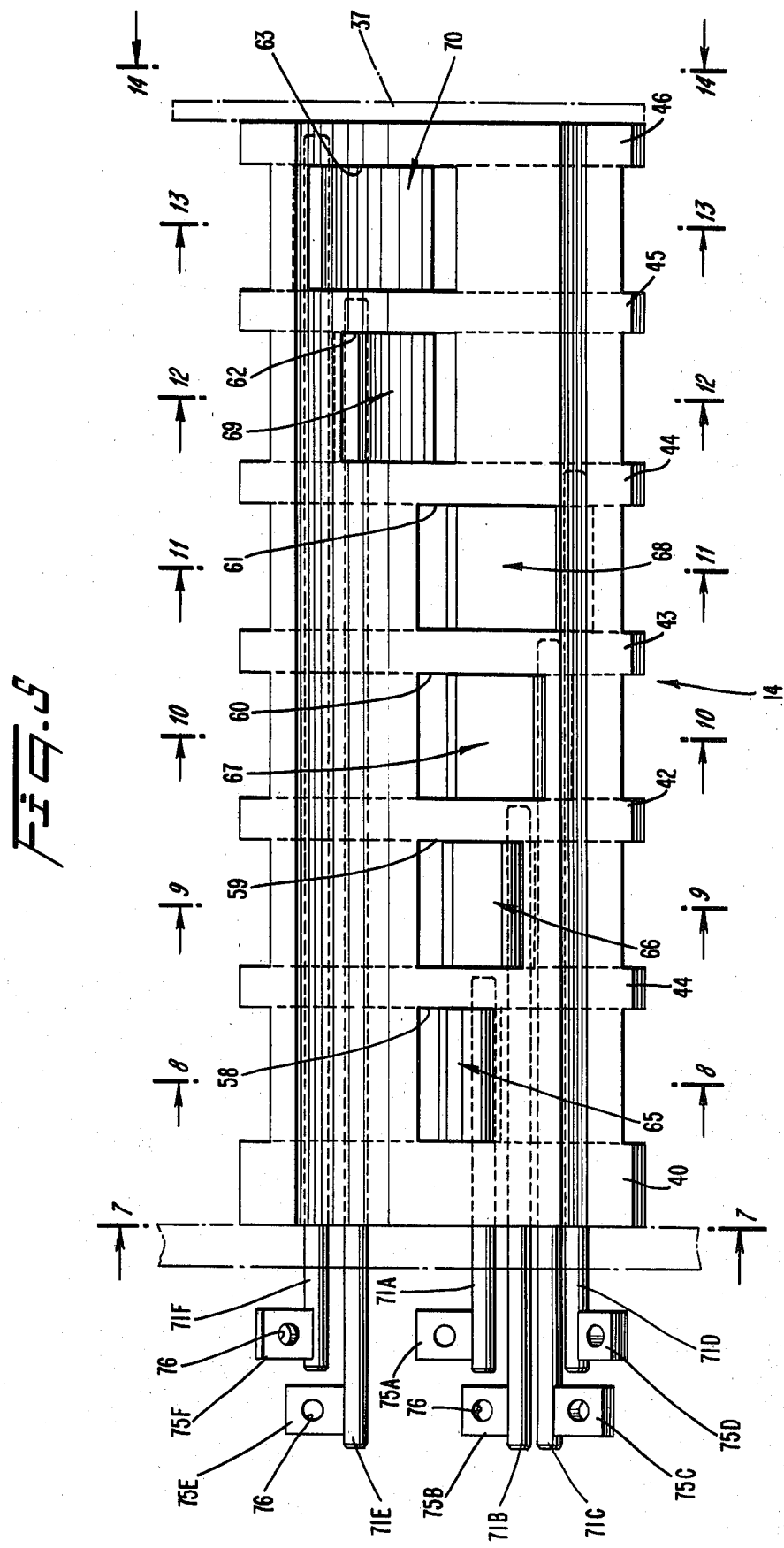

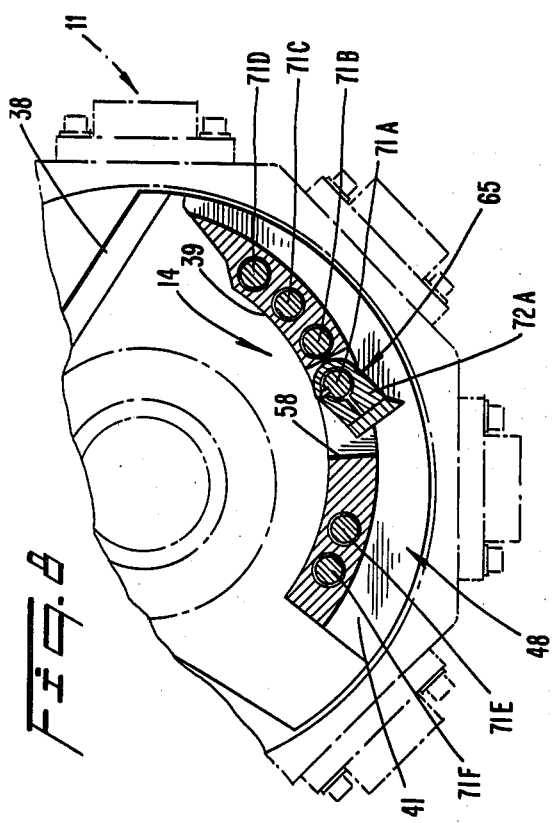
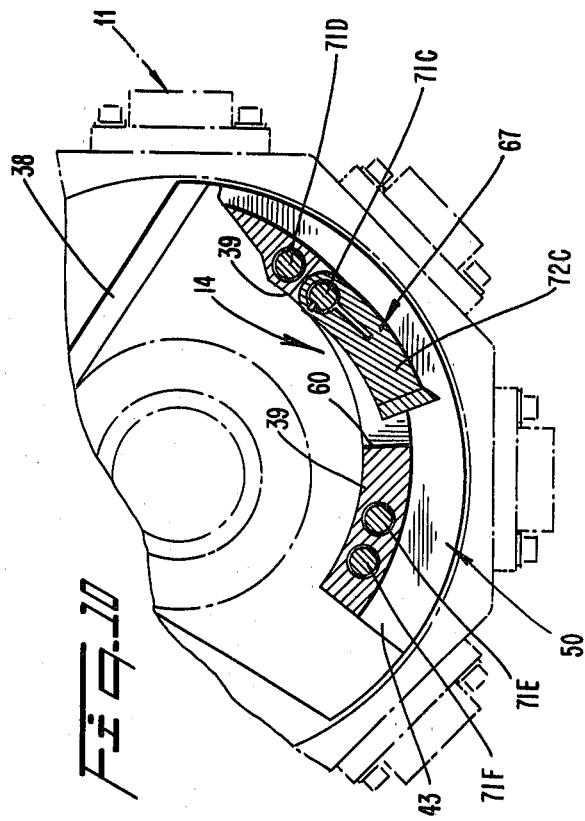
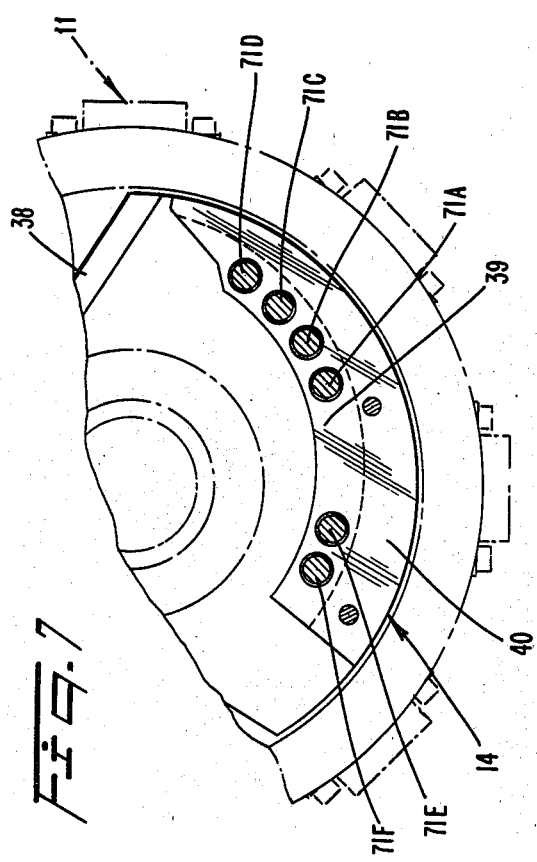
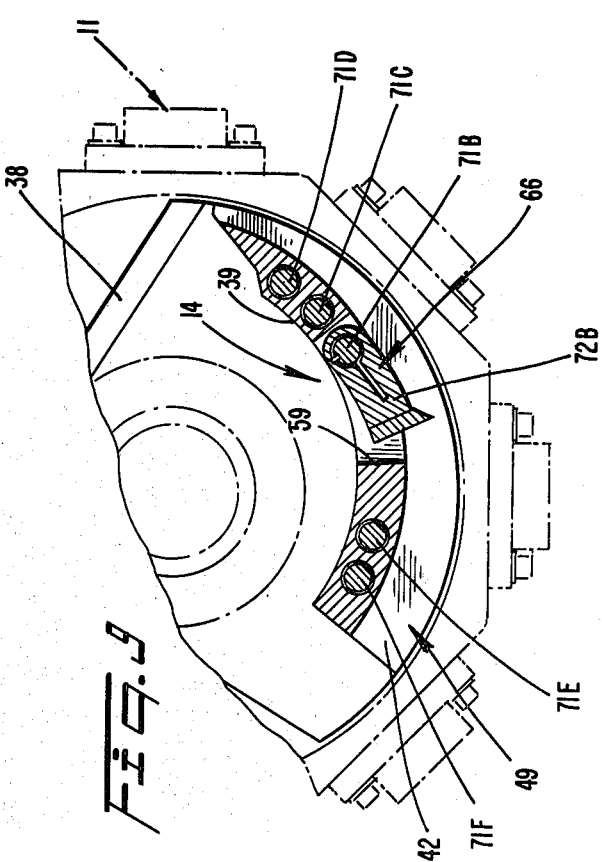

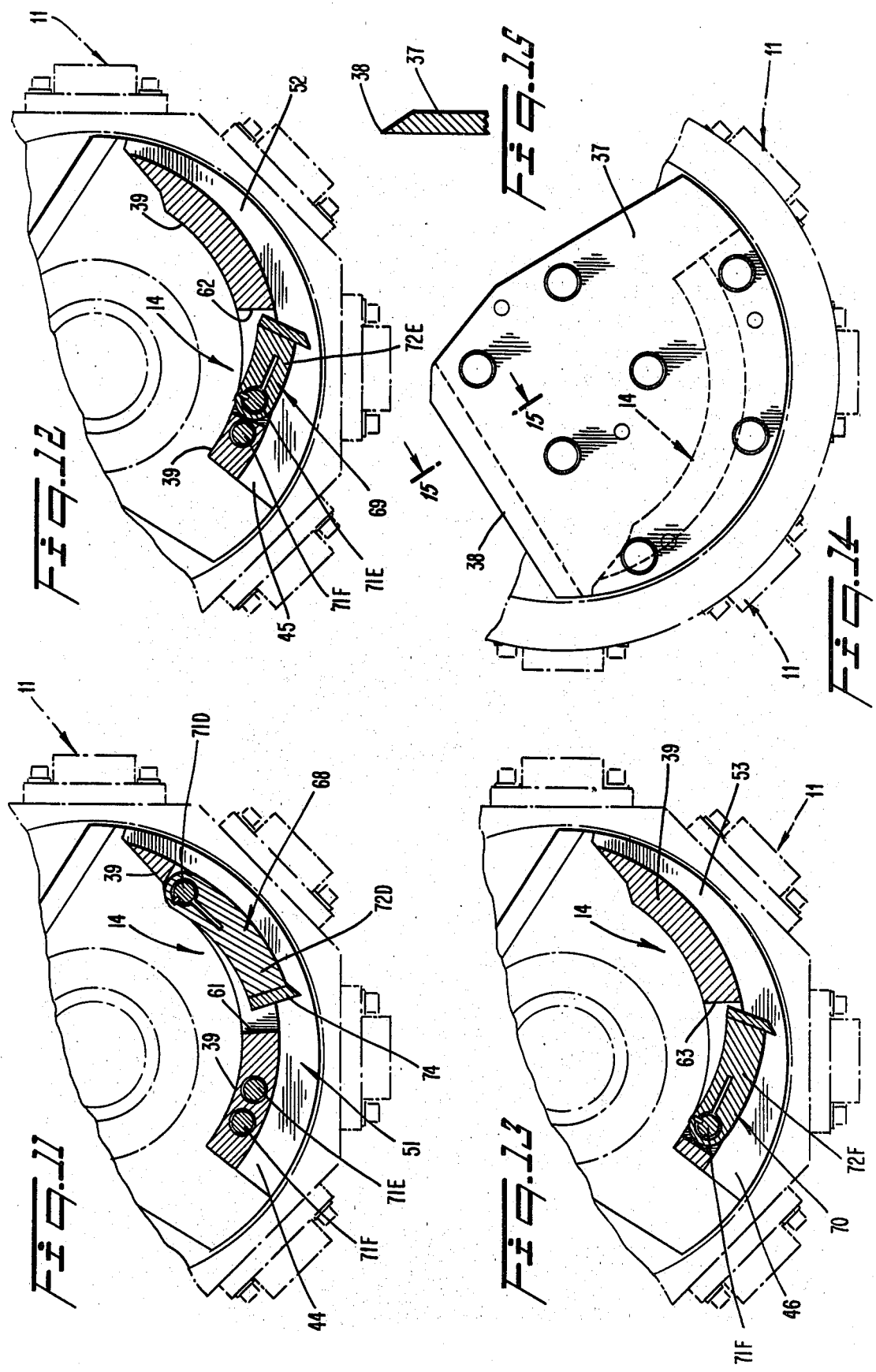

EXTRUSION CYLINDER ASSEMBLY

BACKGROUND OF THE INVENTION

The present invention relates to extrusion apparatus, and more particularly, to apparatus for extruding soft plastic materials.

In the manufacture of biscuit sandwiches, such as sandwich cookies, single biscuits are arranged in rows on a conveyor which passes under a filling-extruding cylinder. The extruding cylinder drops a slice of an extruded filling, such as an icing, onto each of the biscuits. The second biscuit is then added to complete the sandwich.

The extruding cylinders used in the past are of the type shown in U.S. Pat. No. 2,868,141. In these a solid cylinder is fitted with several circumferential rows of spaced pistons which reciprocate within radial bores that intersect the outer surface of the cylinder.

Positioned above the cylinder is a hopper containing filling material. The mouth of the hopper abuts the curved wall of the cylinder, sequentially exposing the bores to the filling material as the cylinder rotates.

The pistons, as they pass the mouth of the hopper, are retracted by a cam mechanism to draw a slug of filling into the bore. As the pistons are carried downwardly toward the conveyor, they are extended to expose the slug of filling. A taut wire slices off a section of the slug, allowing it to fall onto the biscuit.

This type of construction is expensive in that it requires many parts, some of which must be made to precise dimensions. For example, the extruding piston must fit exactly into the bore in which it slides.

Because of the complexity and precision of the mechanism, periodic cleaning of the apparatus requires extensive disassembly and is therefore expensive. Additionally, relacement of broken and worn parts becomes a significant cost factor in using such a complex arrangement.

A very significant limitation of the piston type extruder is that such a mechanism can be used only to extrude round slugs of filling. As a practical matter, a tight fit between the piston and bore can be achieved only with circular configurations. Therefore, if the filling is to be coextensive with the biscuits, this apparatus can be used only in the manufacture of round sandwiches.

Another significant limitation of this type of extruder is that the thickness of the extruded slug cannot be changed without making extensive changes in the mechanisms.

SUMMARY OF THE INVENTION

It is the object of the present invention to provide an improved extrusion cylinder assembly which is inexpensive, simple, flexible, and easy to maintain.

The object of the invention is accomplished by providing an extrusion assembly comprising a rotating hollow cylinder having circumferentially spaced extrusion ports, means for continuously adding extrusion material to the interior of the cylinder and means forming a stationary channel within the cylinder facing the inner surface of the cylinder wall and having a restriction therein, whereby the extrusion material is carried into the channel by engagement with the cylinder wall and is forced out the die ports as they move along the channel toward the restriction.

As will be seen hereinafter, in the present invention the thickness of the extruded slug can be varied by simple adjustments, and the shape of the extrudate is controlled by external dies which are easily replaced by dies providing a differently shaped extrudate.

BRIEF DESCRIPTION OF THE DRAWINGS

A preferred embodiment of the invention has been chosen for the purpose of illustration and description, and is shown in the accompanying drawings, forming a part of the specification wherein:

FIG. 3 is a right side elevational view of the apparatus shown in FIG. 1;

FIG. 5 is a top plan view of the extrusion formation within the extrusion apparatus;

FIG. 7 is a sectional view taken along lines 7—7 on FIG. 5;

FIG. 8 is a sectional view taken along lines 8—8 on FIG. 5;

FIG. 9 is a sectional view taken along lines 9—9 on FIG. 5;

FIG. 10 is a sectional view taken along lines 10—10 on FIG. 5;

FIG. 11 is a sectional view taken along lines 11—11 on FIG. 5;

FIG. 12 is a sectional view taken along lines 12—12 on FIG. 5;

FIG. 13 is a sectional view taken along lines 13—13 on FIG. 5;

FIG. 14 is an end elevational view taken along line 14—14 on FIG. 5;

FIG. 15 is a sectional view taken along line 15—15 on FIG. 14.

DESCRIPTION OF THE PREFERRED EMBODIMENT

Figure 1:
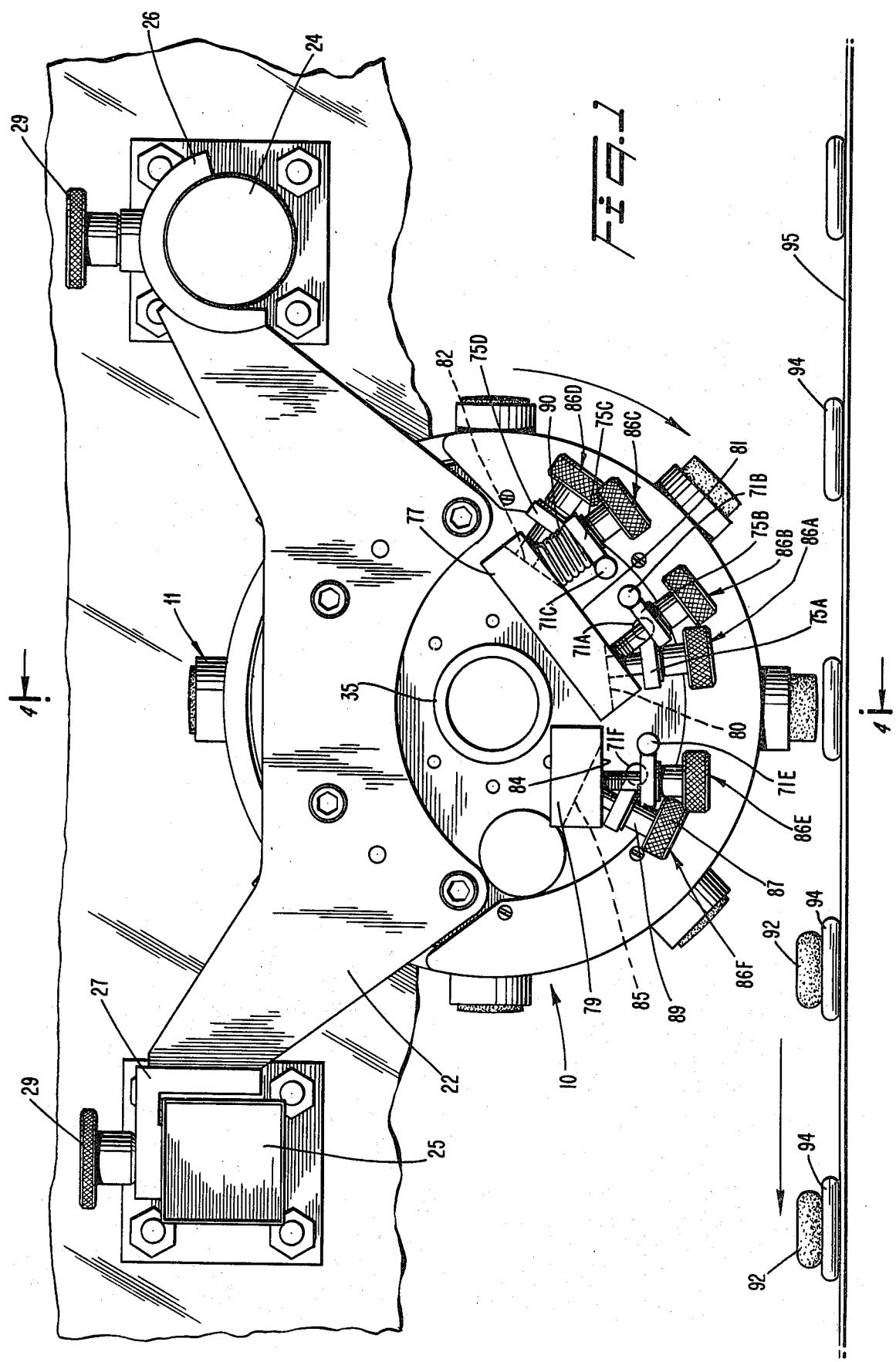
FIG. 1 is a front elevational view of an extrusion apparatus according to the present invention.

Referring now to the drawings in detail, there is shown an extrusion cylinder assembly according to the present invention for use in the manufacture of sandwich cookies filled with creme icing. The assembly generally includes a rotating, hollow cylinder 10 having a plurality of extrusion ports 11, a filling tube assembly 12 extending axially into the cylinder 10, and a stationary extrusion formation 14 positioned within the cylinder for forcing the filling material from the cylinder through the extrusion ports.

Figure 4:
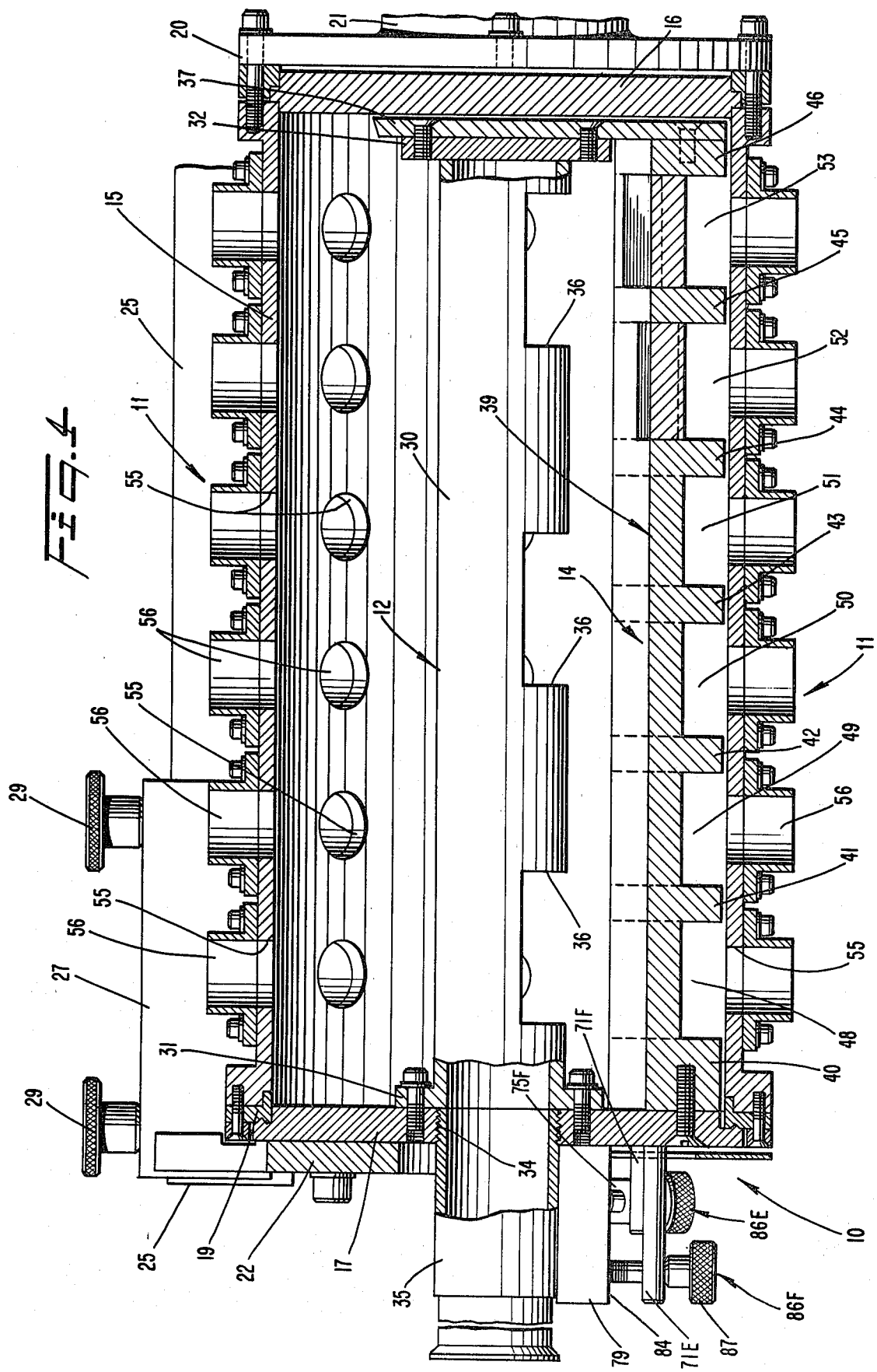
FIG. 4 is a sectional view taken along line 4—4 on FIG. 1.

The hollow cylinder 10 comprises a cylindrical wall section 15, an inner end wall 16 rigidly mounted to the section 15, and an outer end wall 17, which abuts a rotary seal member 19 carried by the section 15. The cylinder wall 15 is bolted to a flange 20 carried by a driven shaft 21. The outer end wall 17 is stationary and bolted to a support plate 22, which extends between a round bar 24 and a square bar 25 that project from a stationary framework (not shown). The plate 22 is generally elongated having a curved formation 26 on one end for engaging the round bar 24 and an angular formation 27 on the other end for engaging the square bar 25. The formations 26 and 27 extend along the bars 24, 25 (FIG. 4) and are secured thereto by machine screws 29, which extend through the formations into threaded bores in the bars. The screws 29 are formed with large knurled heads for manual installation and removal.

The filling tube assembly 12 comprises an inner tube member 30 having a flange 31 on one end and a plate 32 sealing the other end. The tube member 30 is bolted to the end wall 17 (by means of the flange 31) in line with a centrally located threaded hole 34. An outer fill tube member 35 is threaded into the hole 34. The outer tube member 35 is connected by suitable rigid or flexible piping to a pump which delivers the filling material to the cylinder 10, the inner tube 30 is formed with three downwardly-facing openings 36 through which the filling material flows into the cylinder 10.

The extrusion formation 14 is positioned below the tube member 30 and is mounted to the end wall 17 by machine screws. A semicircular plate 37 connects the free end of the formation 14 to the plate 32 mounted on the free end of the tube member 30. The plate 37 is provided with a knife edge 38 to circulate filling material tending to adhere to the wall 16.

In cross section, the formation 14 is generally arcuate, conforming to the curvature of the cylinder wall 15. The formation includes a base portion 39 spaced from the wall 15, and a series of projecting land portions 40 to 46 extending from the base 39 to the inner surface of the wall 15. The lands divide the space between the base 39 and the wall 15 into a plurality of channels 48 to 53 which extend circumferentially with respect to the cylinder wall 15.

The wall 15 is formed with six circumferential rows of port openings 55, each row having eight openings equally spaced around the circumference of the cylinder. Each row of port openings is aligned with one of the channels 48–53. A removable die 56 is secured to the wall 15 at each opening 55 to provide the extrusion ports 11.

As shown in FIGS. 5 and 8-15 the base 39 is formed with openings 58 to 63, one for each of the channels 48 to 53 respectively, to accommodate adjustable dam mechanisms 65 to 70.

Figure 6:
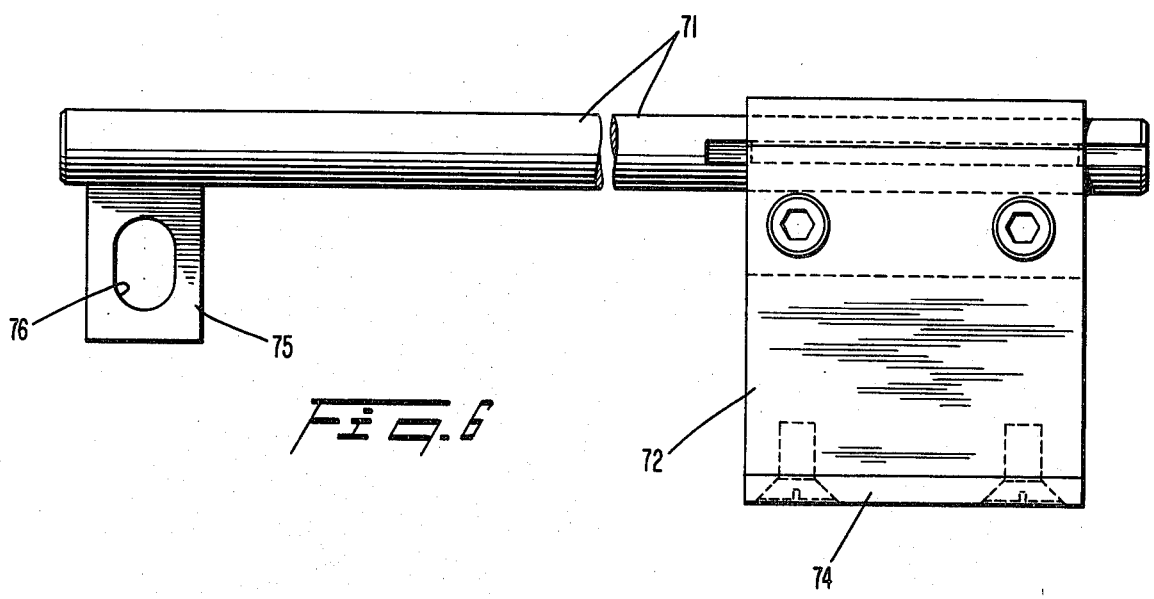
FIG. 6 is a top plan view of a flow controlling dam member.

The dam mechanisms 65 to 70 each generally include (as shown in FIG. 6) a shaft 71, an arm 72 mounted on one end of the shaft and keyed thereto, a blade 74 mounted on the end of the arm, and a control lever 75 mounted on the other end of the shaft.

As shown in FIGS. 5 and 8-14, the dam mechanisms 65 to 70 have shafts 71A to 71F (respectively) of different lengths, and arms 72A to 72F (respectively) of different lengths.

Figure 2:
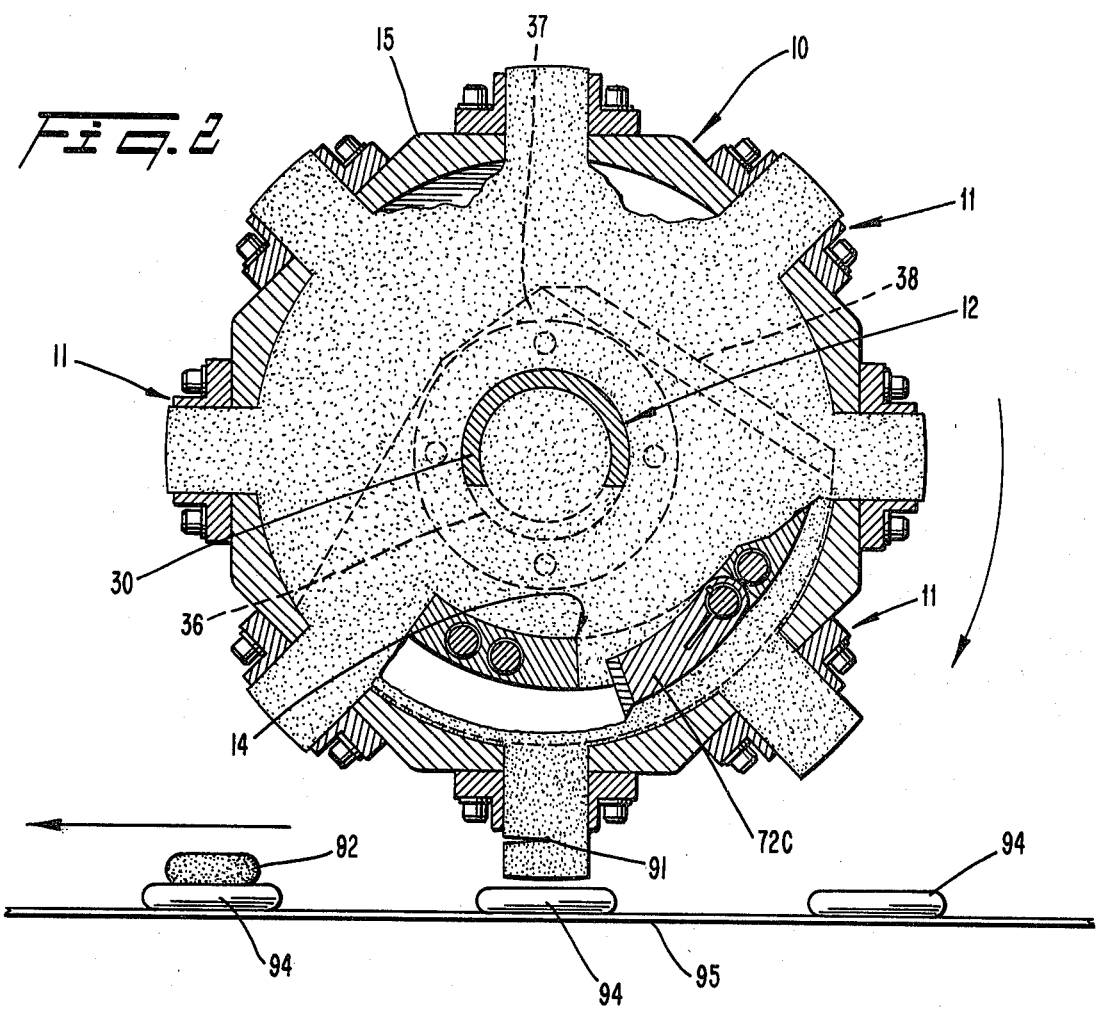
FIG. 2 is a front sectional view of the apparatus shown in FIG. 1.

The shafts 71 extend through parallel bores in the outer end wall 17 and in the base 39 of the extrusion formation 14. The control levers 75A to 75F on the free ends of the shafts are provided with holes 76. As best shown in FIGS. 1 and 2, a pair of blocks 77 and 79 are mounted to the outer face of the wall 17 adjacent the control levers 75.

The block 77 is formed with three planes 80 to 82 aligned with the levers 75A to 75D. The plane 80 faces the lever 75A; the plane 81 faces both levers 75B and 75C; and the plane 82 faces the lever 75D. The block 79 is formed with two planes 84 and 85, aligned with the levers 75E and 75F respectively. The planes 80, 81, 82, 84, and 85 are provided with threaded bores, each of which is in alignment with the hole 76 in the lever (or levers) 75 facing the plane.

Adjusting screws 86A to 86F extend through the holes 76 and are screwed into these threaded bores. The adjusting screws are formed with large knurled heads 87 and shoulders 89 for engaging the levers 75. A coil spring 90 is interposed between each lever 75 and its associated plane, with the adjusting screw 86 extending through the coil spring. Only the spring 90, positioned between the lever 75C and the plane 81, is shown in FIG. 1. The remaining springs 90 are not shown in FIG. 1 (and all of the springs 90 are omitted from the other FIGS.) in order to more clearly show the disposition of the adjusting screws 86.

The adjusting screws 86C, 86D, 86E, and 86F have right hand threads, while screws 86A and 86B have left hand threads. In this way, in all of the adjustable dam mechanisms, the gap betwen the edge of the blade 74 and the inner surface of the cylinder wall 15 is decreased by turning the screw 86 clockwise and increased by counterclockwise rotation thereof.

In operation, a soft plastic creamy filling material is pumped into the cylinder 10 through the fill tube assembly 12. The filling material, which has a viscosity of between about 50,000 and 1,500,000 centipoises, flows through the openings 36 in the tube 30 into the interior of the cylinder. The pump rate is adjusted to maintain the cylinder in a nearly full condition as is shown in FIG. 2.

The cylindrical wall section 15 and the inner end wall 16 rotate with the driven shaft 21 in the clockwise direction, as viewed in FIGS. 1, 2, and 7-13. The filling material in contact with the inner surface of the wall 15 is carried along with the wall by the frictional drag exerted by the wall surface on the filling material and by the tendency of the material to adhere to that surface. The filling material is thus carried into the channels 48-53 of the stationary formation 14 where it encounters the restrictions provided by the adjustable dam mechanisms 65-70. These restrictions impede the continued flow of the material along the channels while the rotation of the wall 15 continues to move material toward the entrance of the channels. As a result the material in the channels experiences a pressure increase. Therefore, as the extrusion ports 11 move along the channels, the filling material which cannot flow past the dam restrictions is extruded out through the ports As shown in FIG. 2 when each port 11 rotates through the bottom point of its revolution, the column of extrudate is severed by a wire cutter 91 and the slices of filling material 92, so formed, fall onto base cakes 94 that are moving past the assembly on a conveyor 95. The upper base cake is applied to complete the sandwich in the conventional manner.

The amount of material extruded by the ports 11 in each row is controlled by the position of the arm 72 in the channel supplying that row of ports. The thickness of the filling in the sandwiches can be easily changed, by a little or a lot, by adjusting all of the dam assemblies. Where each of the extrusion dies 56 are identical, the dam mechanisms can be adjusted relative to each other to compensate for the different inherent flow characteristics at different locations within the cylinder, and so produce a uniform filling thickness for all sandwiches made.

While all of the dies 56 shown in the drawings have round openings, one or more circumferential rows of extrusion ports may be provided with dies of another configuration. In this way, adjacent rows of differently shaped cookies can be manufactured simultaneously. For example, circular dies can be used on one circumferential row, while square dies can be used on an adjacent row, and oblong shaped dies on the next row. In this way, a row of round sandwich cookies having a square filling slice, which can be made next to a row of oblong sandwich cookies having an oblong slice of filling, etc. The different flow rates for each different row, due to the different areas of the differently shaped dies, are easily compensated for by the adjustment of the dam mechanisms.

It will be seen from the foregoing that the present invention provides an improved extrusion cylinder assembly which is inexpensive, simple, flexible and easy to maintain, which can be adjusted readily to vary the filling thickness of one or all of the rows of sandwiches manufactured, which can extrude filling in any shape, and which can simultaneously extrude filling material in different shapes onto adjacent rows of base cakes.

We claim:

1. An extrusion cylinder assembly for extruding a soft plastic material comprising in combination a rotating hollow cylinder having circumferentially spaced extrusion ports, means for continuously adding extrusion material to the interior of the cylinder, means forming a circumferential stationary channel aligned with said ports within the cylinder facing the inner surface of the cylinder wall such that the extrusion material with said cylinder is carried into said channel by engagement with said cylinder wall, and dam means providing a restriction within said channel so that the extrusion material carried into said channel is forced out said die ports as they move along said channel toward said restriction.

2. Apparatus according to claim 1 wherein said soft plastic extrusion material has a viscosity of between about 50,000 and about 1,500,000 centipoises.

3. An assembly according to claim 1 or 2 wherein said cylinder includes a cylindrical wall having at least one row of circumferentially spaced extrusion ports and means for closing the ends of said cylinder, said cylinderical wall being mounted for rotation about its longitudinal axis, and wherein said channel forming means includes a stationary arcuate formation positioned within said cylinder adjacent to the inside surface of the cylinder wall.

4. Apparatus according to claim 3 wherein said extrusion ports include removable extrusion dies.

5. Apparatus according to claim 4 wherein said shafts extends through said stationary arcuate formation in side by side relationships, parallel to the axis of rotation of said cylinder.

6. Apparatus according to claim 5 wherein said arms are of different lengths so that the damming effect of each arm is exerted at generally the same location in each arcuate passageway.

7. Apparatus according to claim 3 wherein said cylindrical wall for rotation therewith and a second end wall, means for mounting said second end wall in a stationary position in sealing contact with said cylindrical wall; and wherein said stationary formation is mounted on said second end wall.

8. Apparatus according to claim 7 wherein said means for continuously adding extrusionn material to said cylinder includes a pipe extending through and rigidly mounted to second end wall; said pipe having outlet openings spaced along the length thereof within said cylinder.

9. Apparatus according to claim 8 including means within said cylinder and adjacent said first end wall for structurally interconnecting the ends of said pipe and said formation adjacent to said first end wall.

10. Apparatus according to claim 3 wherein said dam means is adjustable to control the amount of material extruded from each of said die ports as it passes along said channel.

11. Apparatus according to claim 10 wherein said stationary arcuate formation is formed with a recess inwardly of said channel, said adjustable dam means including a rotatable shaft, an arm locked to said rotatable shaft and movable into and out of said recess to adjustably obstruct said channel, and means for rotationally orienting said shaft to control the rate of extrusion.

12. Apparatus according to claim 10 wherein said cylinder is provided with a plurality of circumferential rows of extrusion ports, said channel providing means within said cylinder provides a plurality of channels, dam means are provided for each of said channels, and means are provided for individually adjusting each of said dam means to individually control the amount of material extruded from each row of die ports.

13. Apparatus according to claim 12 wherein said stationary arcuate formation within said cylinder is provided with lands extending into contact with the inside surface of said cylinder wall to form the sides of said channels.

14. Apparatus according to claim 13 wherein said stationary arcuate formation is formed with a recess inwardly of each of said channels, each of said adjustable dam means including a rotatable shaft, an arm locked to said rotatable shaft and movable into and out of said recess to adjustably obstruct each channel, and means for individually orienting the rotational position of each shaft to adjust the extrusion rate of each row of dies.

* * * * *

UNITED STATES PATENT OFFICE
CERTIFICATE OF CORRECTION

Patent No. 4,397,628               Dated April 9, 1983

Inventor(s) Pinto, et al.

It is certified that error appears in the above-identified patent and that said Letters Patent are hereby corrected as shown below:
column 5 line 48 "4" should read --14--; "said" should read --the--
column 5 line 49 "extends" should read --extend--
column 5 line 50 "relationships" should read --relationship--
colum 6 line 3 after "said" insert --cylinder further comprises a first end wall fixedly mounted on said--

Signed and Sealed this

Twenty-fifth Day of March 1986

[SEAL]

Attest:

DONALD J. QUIGG

Attesting Officer          Commissioner of Patents and Trademarks